United States Patent [19]

Smith et al.

[11] Patent Number: 5,250,963
[45] Date of Patent: Oct. 5, 1993

[54] IMAGING DIODE ARRAY AND SYSTEM

[75] Inventors: Ronald S. Smith, Palm Bay, Fla.;
Matthew J. Olenski, Dayton, Ohio;
Vincent T. Kubert, Melbourne, Fla.;
Mark F. Duchesne, Dayton, Ohio

[73] Assignee: AM International, Inc., Chicago, Ill.

[21] Appl. No.: 743,455

[22] Filed: Aug. 8, 1991

Related U.S. Application Data

[62] Division of Ser. No. 457,433, Dec. 27, 1989, Pat. No. 5,121,146.

[51] Int. Cl.$^5$ .............................................. G01D 15/14
[52] U.S. Cl. ................................. 346/160; 346/107 R
[58] Field of Search ............... 346/107 R, 160; 357/82

[56] References Cited

U.S. PATENT DOCUMENTS

| | | | |
|---|---|---|---|
| 3,711,789 | 1/1973 | Dierschke | 357/82 X |
| 4,445,128 | 4/1984 | Dolan et al. | 346/160 |
| 4,455,562 | 6/1984 | Dolan et al. | 346/107 R X |
| 4,596,995 | 6/1986 | Yamakawa et al. | 346/160 |
| 4,706,130 | 11/1987 | Yamakawa | 358/296 |
| 4,780,731 | 10/1988 | Creutzmann et al. | 346/108 |
| 4,855,760 | 8/1989 | Kanayama | 346/107 R X |
| 4,897,672 | 1/1990 | Horiuchi et al. | 346/107 R |
| 4,937,591 | 6/1990 | Miyake et al. | 346/107 R |
| 4,942,405 | 7/1990 | Dody et al. | 346/107 R |
| 4,956,684 | 9/1990 | Urata | 346/107 R X |
| 4,962,375 | 10/1990 | Hirane et al. | 346/107 R X |
| 4,967,192 | 10/1990 | Hirane et al. | 346/107 R X |
| 4,982,203 | 1/1991 | Uebbing et al. | 346/107 R |
| 5,016,027 | 5/1991 | Uebbing | 346/107 R |

Primary Examiner—Benjamin R. Fuller
Assistant Examiner—Randy W. Gibson
Attorney, Agent, or Firm—Tarolli, Sundheim & Covell

[57] ABSTRACT

A large scale LED exposure array and system for printers, and unique methods of inputting data to and operating such an array, are disclosed. The array can be loaded and refreshed with data information at rates compatible with high speed printing, and forms part of an electronic image forming and handling system which can load an refresh an exposure array at variable speeds of at least 100 to 300 ft./min. The system includes compensation for differences in illuminating capability of individual LEDs in a large array, by introducing modifications in LED on-time which are centered with respect to the incremental area of the photoreceptor on which a pixel is to be formed, and to compensate for changes in pixel exposure time with increase in speed of the photoreceptor. Also disclosed are an LED configuration which can emit high energy in a controlled pattern to give a desired pixel spot on a photoreceptor, and an arrangement for mounting the array to maintain each light emitting spot in focus on the photoreceptor surface, although a wide array is employed.

3 Claims, 11 Drawing Sheets

LED LIGHT OUT PROFILE   ENERGY PROFILE   PIXEL SPOTS PROFILE

DRUM MOTION

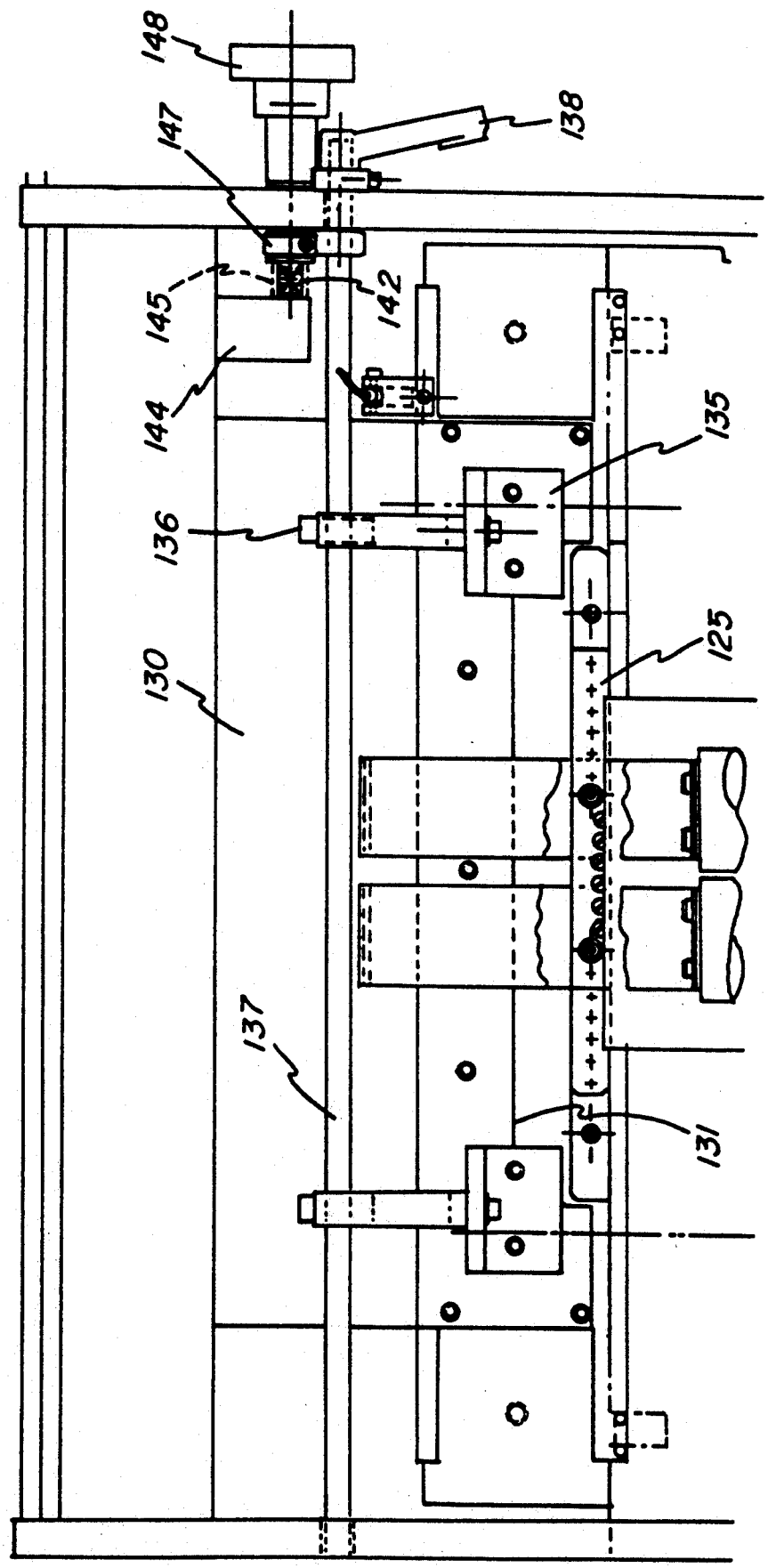

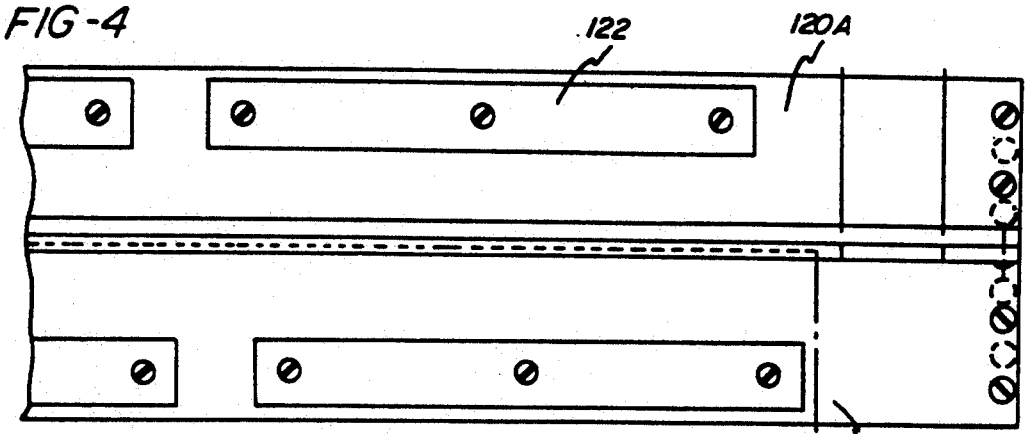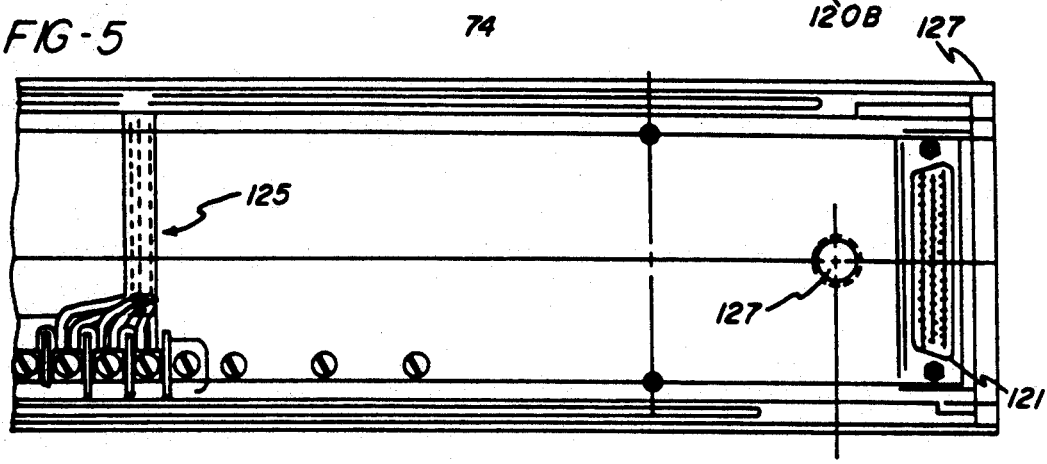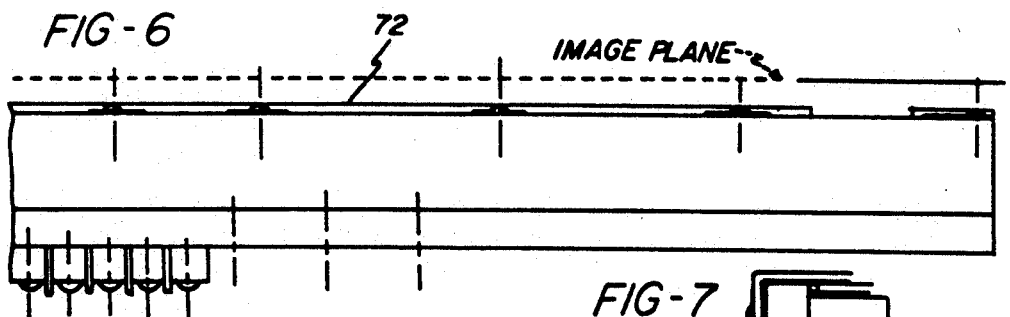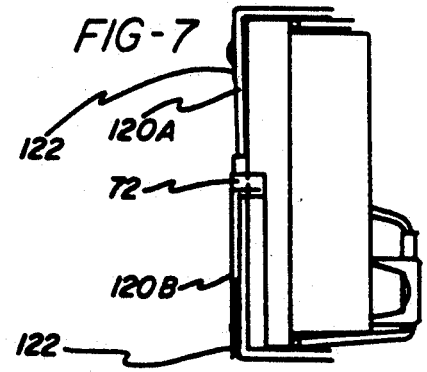

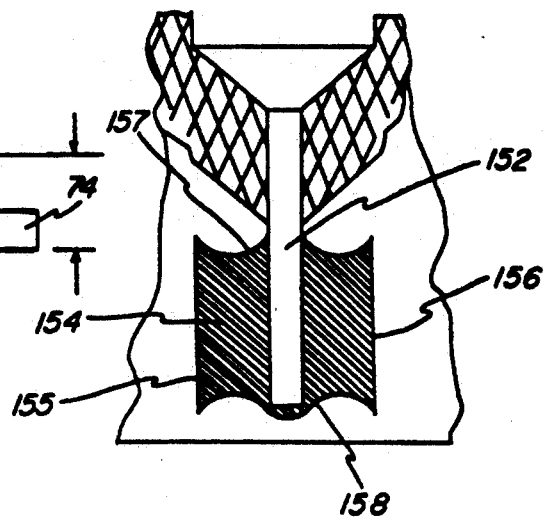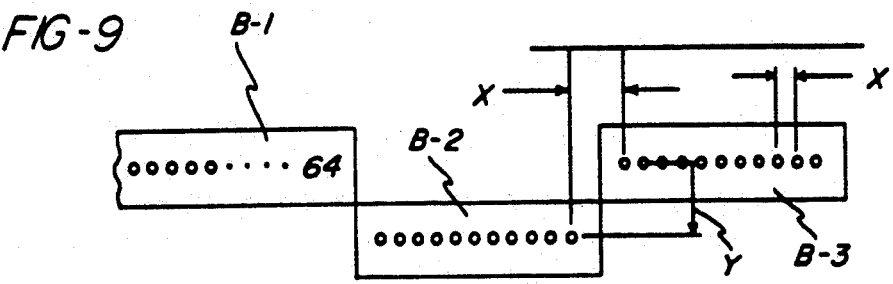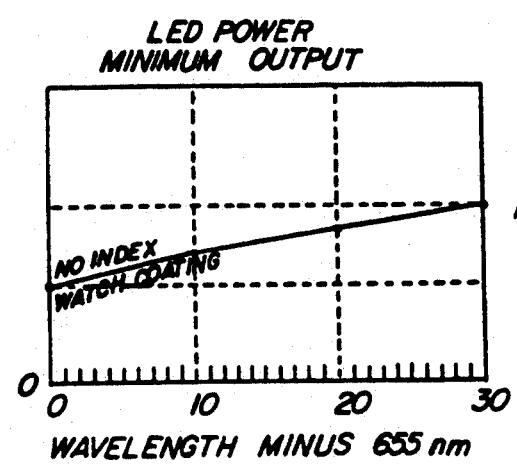

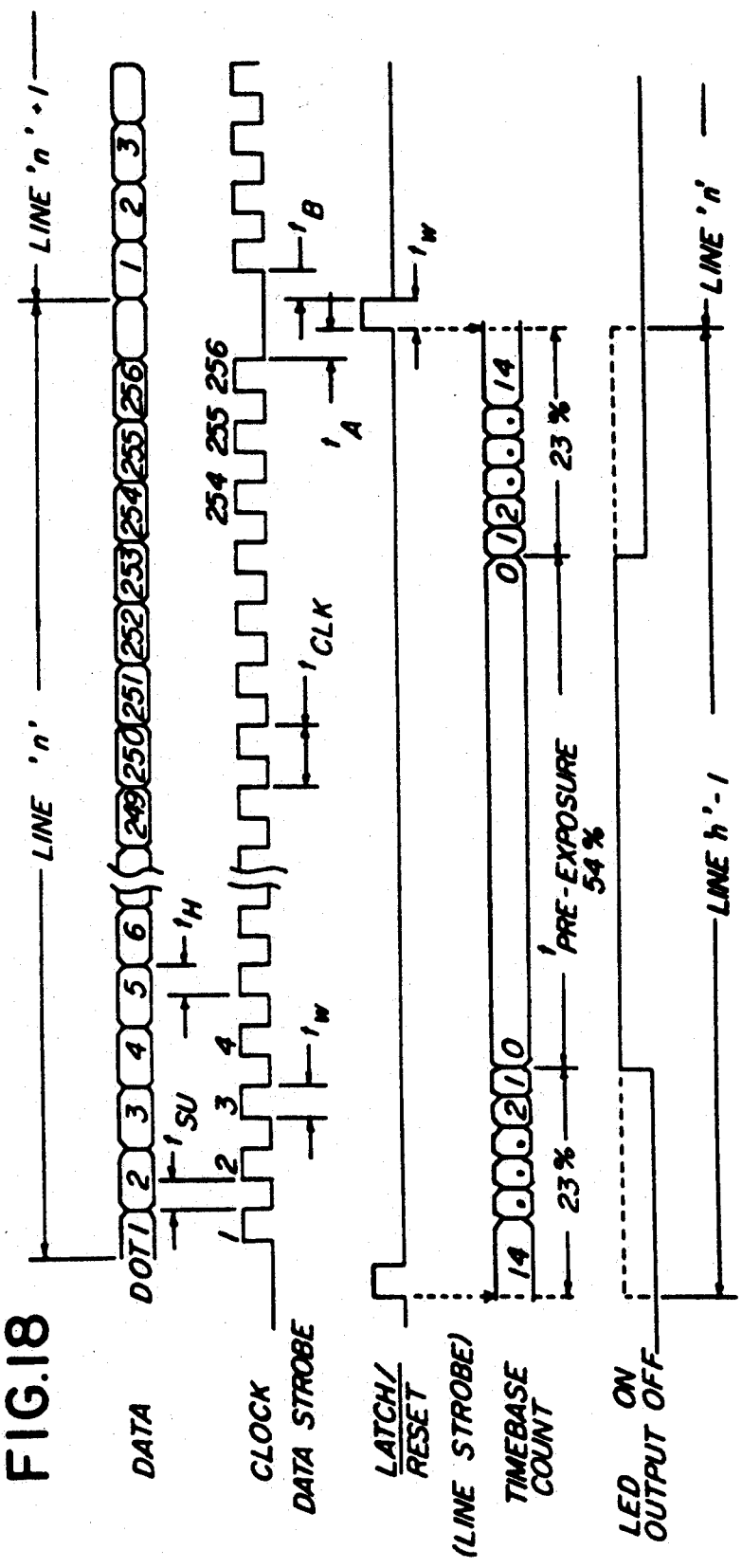

IMAGING DIODE ARRAY AND SYSTEM

RELATED APPLICATION

This application is a division of application Ser. No. 07/457,433 filed 27 Dec. 1989, U.S. Pat. No. 5,121,146.

BACKGROUND OF THE INVENTION

This invention relates to an imaging array and system, and a method of operating the same, in which a large number of closely spaced imaging devices, preferably light emitting diodes (LEDs) optically coupled to a common lens system and electronically coupled into an organized driving system, are capable of high speed exposures of incremental areas of a photoreceptor. An image or images can thus be formed of a large number of small pixels, at resolutions in the order of three hundred lines per inch, on copy material of various types, and at speeds in the order of 100 to 300 ft./min.

The combination of such resolution and speed has been heretofore unattainable as a practical matter. Relatively sophisticated copy machines have been developed, using powder toner, and while a few of these have capability of printing on web material those units are essentially a variation of similar sheet fed copiers. They all have operating speeds in the eighty to ninety copy/minute range, and this speed is fixed. Their exposure and development systems will not tolerate variation in speed. Such prior art copiers, by their very nature, are also sensitive to characteristics of the copy material, e.g the sheet on which the copy is made. In general, those copiers have difficulty making good reproductions on certain coated papers, or on material of variable thickness as where blank labels are already adhered to the material.

Diode array exposure systems have been known, such as disclosed in U.S. Pat. Nos. 4,455,562, 4,596,995 and 4,780,731, however due to limitations in data handling capacity and LED optical output power, prior art arrays have been limited to relatively low speeds and to array lengths in the order of twelve inches (the top-to-bottom dimension of most text to be copied). Higher speeds are not attainable due to the manner in which data is transferred to the individual LEDs of an array, and in the power limitations which prevent light radiated from such prior art arrays from effectively forming an electrostatic image on a photoreceptor surface.

Furthermore, it is known that an array of large numbers of LEDs will exhibit differences in light intensity output among the individual LEDS. Such intensity variations can cause significant differences in the discharging of pixel areas on a charged photoreceptor surface (such as on a rotating drum). As speeds are increased, the resulting problems magnify. Thus, a number of ways have been suggested to compensate for the LED light output variations. One scheme requires that the array be scanned, one LED at a time, and the observed differences in light output from the individual LEDS is used to develop a look-up table. Such a table in turn is read to modify the on-time of the LEDs to produce a closer average light output from all LEDs in the array each time they are individually driven in response to a character generating input. Another scheme uses a light detector in the array to detect the outputs of the LEDs when they are driven, and to provide immediate feedback compensation to the driving circuit.

However, the clocking and scanning circuits used for driving the LED arrays are generally synchronized to motion of the photoreceptor, e.g. drum rotation. Such compensation schemes have not, heretofore, taken into account the fact that by lengthening the on-time of certain ones of the LEDs, the mid-point of LED on-time is varied. In other words each LED to be driven, in exposing desired ones of a row of pixels across the photoreceptor, will initiate exposures at the same instant, but exposures will stop at different times. Thus, centering of the LED ontime with respect to the desired center of the pixel area on the photoreceptor is disturbed by those compensation schemes.

SUMMARY OF THE INVENTION

While the principal novelty of this invention resides in unique features of an exposure array for a printing engine (or engines), some of these features are per se novel and when combined result in a vastly improved and more efficient printing engine than has heretofore been known to the printing trade. Such a printing engine employs (a) digital electronic image creation and generation;

(b) electrophotographic printing, e.g. electrostatic printing of images, preferably using liquid toner for image development;

(c) the type and versatility of web handling associated with modern printing presses, including web feeding under controlled tension, which in turn contributes to accurate length control; such length control is of substantial importance in registration of images in multi-image (e.g. multi-color) printing;

d) ability to print on a substantial variety of materials, of different thickness or other characteristics; and e) ability to maintain quality electronically printed product at substantial speeds, in a range of at least 100 to 300 feet/minute (or even greater), and during speed changes within that range.

In a comprehensive preferred embodiment, the invention is a unique combination of digital electronic image creation and generation, combining fixed and variable digital (bit-mapped) image information, producing the resulting images by electrophotographic methods using a unique LED array capable of high speed and graphic arts quality resolution, and developing those images onto web material using printing press web handling techniques.

The preferred embodiment provides a printing press which has the ability to produce a digital representation of images to be printed without preparing photographic negatives and printing plates, to transmit the image information directly to the electrophotographic printing engine, and to print the same or different images on each printed copy.

Images are created in the printing engine by a digital dot-image exposure system which is electronically driven from imaging data which can be refreshed, a page at a time, to produce successive identical copies of desired forms, and which can also be modified without slowing of the printing engine so as to print variable data (e.g. numbering, bar coding, or personalized information) or to switch "on the run" to an entirely new job. The direct digital input of the printing engine also allows customizing different parts of a job, merging of standard or base information with variable information, and the establishment of a library of customer's jobs which can be quickly recalled and re-run upon short demand.

The unique printing engine utilizes a drum having a surface photoreceptor, e.g. a photoconductive surface as the active surface on which developed electrostatic images are created, and an offsetting arrangement by which these images are transferred to the forms material, most commonly a paper web. The digital imaging device, in the form of a high intensity LED array mounted to extend transversely of the rotating drum surface, operates to discharge the background or non-image areas of the passing drum surface to within a range of substantially lower potential, by exposing individual dot areas (pixels) to focused radiation at a predetermined frequency and intensity, and in area size in the order of 0.003 inch diameter, whereby the remaining or image areas(s) comprise a latent electrostatic image of the printed portions of the form. The size of these pixels provides an acceptably high resolution image for many types of printing, and in fact the resolution is comparable to good quality lithographic offset printing.

The four basic components of the imaging system are a Scheduler Control Unit (SCU), a Raster Image Processor (RIP) which includes character generator capability, a Data Interface Unit (DIU), and the novel LED array. The controlling intelligence behind the imaging system is accomplished through the SCU. The SCU synchronizes all print data to the web, prepares all imaging resources that are required, channels text data from a host computer, and controls all data transfer through the system. The raster image processor (RIP) is basically a form of a commercially available character generator. It accepts information, such as ASCII character codes, and outputs bit-mapped information for generating such characters in a dot pattern, based on the font(s) selected.

The DIU contains all the storage and location circuitry required for storing text and baseforms in rasterized bit-map format. Pairs of DIU memory sections cooperate with each other to provide bit-mapped fixed (e.g. base form) and bit-mapped variable image data. In use, one pair of memory sections is scanned to output data to registers at the LED array, while the other pair is loaded with data. Thus enough memory is available in each DIU for both base form and variable information for two images. The SCU controls the input and output of data to and from the DIUs, and transfers pixel initiating data to the LED array, line-by-line.

The LED array is divided into twenty four modules of 256 LEDs each, together with latching shift register circuits, comparator circuits, and driver circuits for each LED, as is generally known in the prior art. A set of EPROMs receives data clocked into them from the DIU. This data may be termed "pixel initiating" or writing data, since it determines whether or not a pixel is or is not printed at a given location, e.g. this data determined whether or not any specific LED is to be driven in exposing a line of pixel areas by driving the array.

A bank of EPROMS have stored in them compensation information (in a typical embodiment four-bit codes) which determines modification of LED on-time to compensate for non-uniform light emissions from different ones of the LEDs. Data is clocked simultaneously into the EPROMS from the DIU via a set of paired data lines which extend to the respective EPROMS. Thus pixel initiating data is transferred in parallel to the EPROMS. The clock controls in turn function to distribute this data serially into the individual registers. Thus, data is loaded simultaneously into the several EPROMs, but sequentially into their internal registers, and the loading time is that for only one EPROM.

A current-source driver for each LED applies power to the LED for generating a small light beam onto the drum surface at a given pixel location. Each driver circuit is in turn controlled by a comparator circuit which distributes the compensated LED driving data from the EPROMs to the correct LED driver circuit. Each comparator circuit is in turn supplied with data from a register/latch circuit (see FIG. 17) which receives the four-bit LED driving data from the associated EPROM. That driving data is loaded (e.g. transferred) into the register/latch circuits, in preparation for loading the information for the next line of pixels from the DIU into the EPROM circuits, and is held available for the comparator circuits to distribute to the individual drivers at the appropriate times.

Each EPROM uses an on-off signal from the DIU as an address line into the EPROM. An "off" signal will result in a four-bit zero code to be sent to the comparator circuit, while an "on" signal will cause the EPROM to send a four-bit compensation value to the register/latch circuit in the appropriate module.

The data from the DIU memory is clocked into the EPROM circuits under control of the SCU at a rate which is greater than the fastest usage of the data to refresh the state of the LED drivers for each line. This is also true of the transfer of data from the EPROMs into the latch/registers. Utilization of the LED driving data will, however, be at a variable rate depending upon web and drum speed. Thus, data is fed to the LED array from the DIU at a high rate, compensation data is added, and the resultant driving data is fed to the latch/registers at the module inputs at this high rate. This driving data is used, that is, it is distributed to the individual driver circuits, at a rate which is lower, and which varies dependent upon web and drum speed. The driver circuits are also compensated to increase the driving current of all of them as higher printing speeds are called for.

An encoder pulse generator is driven with the photoreceptor drum and provides outputs equal to one-eighth of a pixel height, i.e. eight pulses per pixel. That output divided by eight is the source of a latch pulse train, each latch pulse coinciding with the top border of a line of square pixel areas across the photoreceptor surface. Due to the variable speed capability of the apparatus, the duration between successive latch pulses will vary considerably, in a range of at least three to one, as web/drum speed is changed.

The SCU receives the divided PG outputs, divides the time between leading edges of successive latch pulses by sixty-four, and generates a time base count which equals 1/64th of the latch/reset interval. This represents the maximum time, at a chosen drum and web speed, during which an LED can be driven. This timebase information is sent to the time base drivers and also to the latch-reset drivers which cause the module shift registers to output data to each comparator. This time between latch pulses in effect represents a time interval or window during which the LEDs may be driven, depending upon the state of the pixel initiating data bits (on or off). The comparative data stored in the EPROMs is also latched into the comparator circuits as part of the LED driving instructions, and this determines at which one of the timebase counts the drivers will be effective to apply power to their corresponding LEDs.

The unique shape, size and design of the LEDs is the result of considering the distribution of light energy emitted by the LED, its effect resulting in photo-induced discharge of the photoreceptor surface, the toner, and the development zone toner deposition characteristics. To obtain images with no undesirable voids, the pixel areas should be evenly exposed with sharp boundaries, e.g. the desired printed spot is square, filling the entire pixel area. However, in the diode array there must be non-emitting space between LEDs to prevent electrical and optical crosstalk. The distribution of light energy falling on the photoreceptor surface is a function of the shape of the diode junction, the shape and position of the anode contacts, the imaging accuracy of the lens system, the turn-on time of the diode junction, and the motion of the photoreceptor past the LED during exposure. Analysis of these complex variables has resulted in an optimum emitter shape as shown, with notable characteristics of (a) a center finger-shaped anode, (b) a height smaller than the pixel size in the direction of photoreceptor motion, and (c) an hourglass like shape disposed lengthwise of the array to smooth the transition to adjacent pixels.

The entire array is fastened to the lower end of a flat mounting spring. At the opposite front sides of the array there are strips of electrically insulating wear-resistant material which provide a form of bearing surface aligned to press against end bands of the drum surface. These strips function to maintain an exact spacing of the array lens from the image plane (i.e. drum surface photoreceptor) in spite of any out of round or other condition which might be introduced to the drum or its mounting, as the result of slight manufacturing or assembly discrepancy or due to wear. The mounting spring acts to urge the entire array toward the drum, thus holding the strips against the drum edge bands during operation.

Accordingly, the object of this invention is to provide a novel LED exposure array and system for printers, and novel methods of inputting data to and operating the array; to provide such an array which can be loaded and refreshed with data information at rates compatible with high speed printing; to provide a novel LED configuration which can emit high energy in a controlled pattern to give a desired pixel spot on a photoreceptor; to provide an electronic image forming and handling system which can load and refresh an exposure array at variable speeds of at least 100 to 300 ft./min.; to provide a novel system for compensating for differences in illuminating capability of a large array of LEDs by introducing modifications in LED on-time which are centered with respect to the incremental area of the photoreceptor on which a pixel is to be formed, and to compensate for changes in pixel exposure time with increase in speed of the photoreceptor; and to provide a novel arrangement for mounting the array to maintain each light emitting spot in focus on the photoreceptor surface, although a wide array is employed.

Other objects and advantages of the invention will be apparent from the following description, the accompanying drawings and the appended claims.

BRIEF DESCRIPTION OF THE DRAWINGS

FIG. 3 is a partial side view of the mounting, taken from the left of FIG. 2;

FIG. 4 is a partial view on an enlarged scale of the front of the LED array;

FIG. 5 is a partial rear view of the array, opposite from FIG. 4;

FIG. 6 is a partial top view of the array showing also its relation to the image plane at the drum surface;

FIG. 7 is a side view of the array;

FIG. 8 is a diagram of the components of the LED array and their relationship to the image plane;

FIG. 9 shows the arrangement of LEDs in the modules of the array;

FIG. 10 is an substantially enlarged view of one LED junction;

FIG. 12 is a diagram of the power/wavelength rating of the LEDs;

FIG. 18 is a timing chart.

DESCRIPTION OF THE PREFERRED EMBODIMENT

Figure 1:
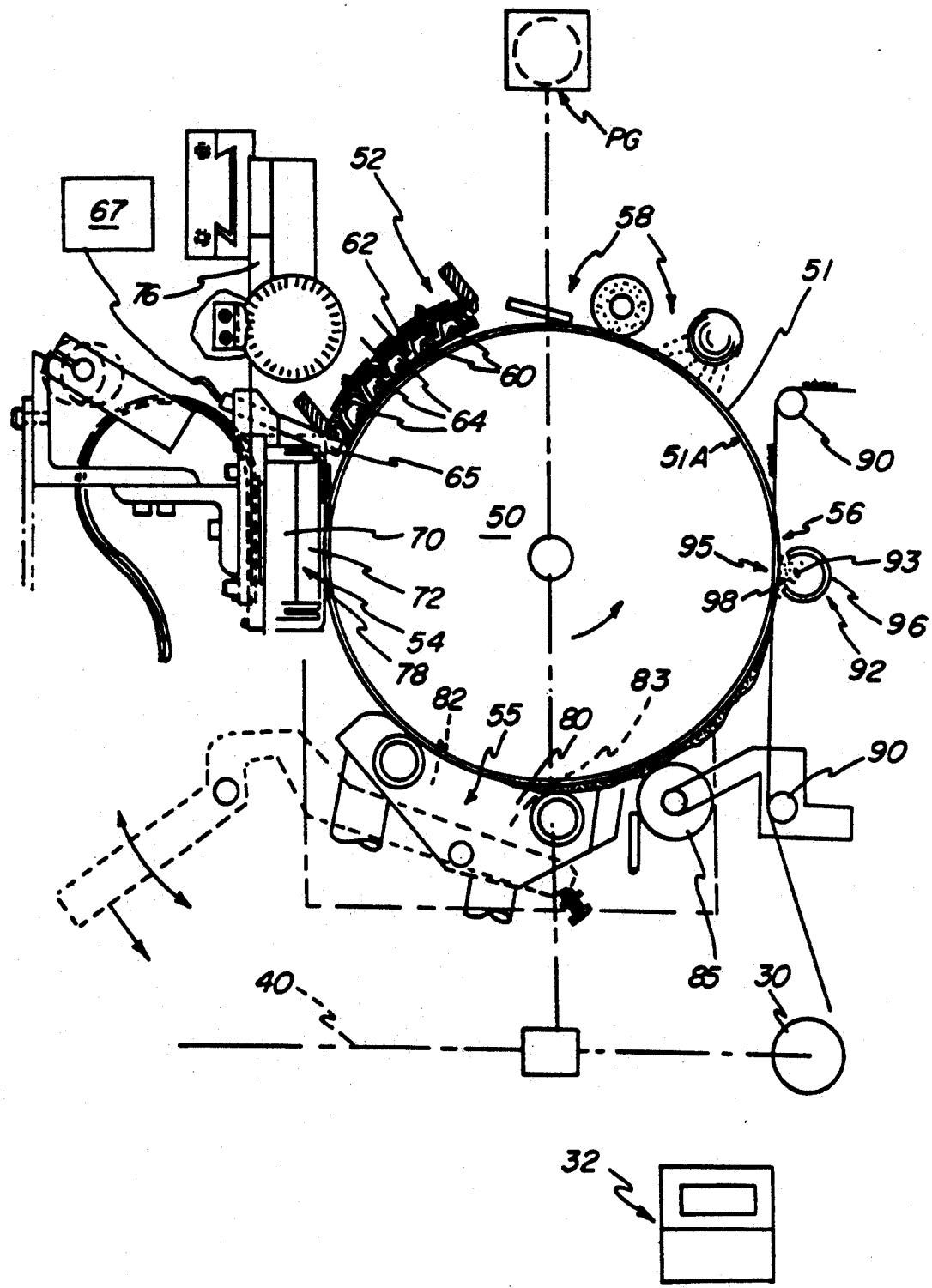
FIG. 1 is a schematic view of the components of an electrostatic printing engine employing the imaging system of the present invention.

Referring to FIG. 1, the printing engine utilizes a rotatably driven drum 50 driven by a suitable power source. In one embodiment, a motor 30, governed by a suitable speed controller 32 in the press control console, drives a line shaft 40 which is coupled to rotate drum 50. That drum has an active surface 51 on which developed electrostatic images are created, and an offsetting arrangement by which these images are transferred to web material W, most commonly a paper web. At the edges of drum surface 51 are annular bearer bands or rims 51A, which may be conveniently formed as hardened circumferential bands about the edges of the drum body. The drum is rotatably driven at a peripheral velocity equal to web speed, and drum surface 51 is a light sensitive photoconductor or photoreceptor (for example $As_2Se_3$) which behaves as an insulator in dark, and a conductor when exposed to light. As is typical of such photoconductors, certain wavelengths of optical radiation will produce the best results for this purpose.

Special systems are arranged sequentially around drum 50, as shown in FIG. 1, to accomplish the desired formation and transfer of images onto web W. These systems include a high intensity charging apparatus 52, an exposing-discharging or imaging apparatus 54 to which the present invention is particularly directed, developing apparatus 55, transfer apparatus 56 and cleaning apparatus 58. These assure the drum surface is discharged, cleared of residual developer materials, and has a uniform electrostatic charge applied to its photoconductive surface each revolution, while the developed images are continually transferred to web material W.

That uniform charge is in the order of at least +1000 Volts DC, preferably between +1000 and +1450 V. To assure thorough and uniform charging of the photoconductive drum surface corotron charging wires 60 are impressed with a potential in the order of +5600 to +6800 V, and are mounted in appropriately shaped shield member 62 which is divided into separate focusing chambers 64, one for each corona discharge wire 50. This assembly extends across the drum surface 51 and along an arc closely parallel to surface 51.

Counterclockwise around the drum (as viewed in FIG. 2) there is a charge potential sensor 65 which senses the voltage at the surface 51 and provides a continuous feedback signal to the charging power supply 67, thereby adjusting the charge level of the photoconductor surface 51 regardless of variations due, for example, to irregularities in the power supply or changes in the peripheral velocity of drum 50.

The digital imaging device 54, in the form of a relatively high intensity LED double row array 70, is mounted to extend transversely of the rotating drum surface 51. Each LED is individually driven and emits light in the range of 655 to 685 nm., through a self focusing lens 72 onto the drum surface 51 to create a dot or pixel size of 0.0033 inch diameter. There are a sufficient number of LEDs to expose the entire active width of the photoreceptor surface 51 at a resolution of 300 dots/inch over a twenty inch width. This size is comparable to web widths typically used in manufacture of a wide variety of business forms.

In the embodiment disclosed there are a total of 6144 LEDs in the array, divided among twenty four modules (M-0 / M-23, see FIG. 14) each containing four blocks (B1-B4) of sixty four LEDS each, arranged in two alternating or interdigitating rows (FIGS. 8 and 9) the centers of which are spaced apart in a direction along the circumference of the drum surface by a distance Y (for example 0.010 inch). Four blocks in one row (e.g. B1, B3, B5, B7) make up one module, and the four alternate blocks (B2, B4, etc) in the other row make up another module. All the blocks are fixed to a liquid cooled base block 74, with the lens assembly 72 attached to the front of the array. The space X between adjacent LEDs in the same row or block is 0.0033 inch horizontally, or transverse to the drum surface, and the LED arrays in the two rows, or adjacent blocks, are offset horizontally by the same dimension X, thus the entire array of LEDS can cooperate to discharge selected ones of a continuous series of adjacent dot areas or pixels across drum surface 51 at a resolution of 300 dots/inch.

Light from the LEDs operates to discharge the background or non-image areas of the passing drum surface to a substantially lower potential, for example in the order of +100 to +300 V. DC, by exposing individual dot areas to radiation at a predetermined frequency, as later mentioned, whereby the remaining or image area(s) comprise a latent electrostatic image of the printed portions of the form. The size of these pixel dots provides an acceptably high resolution (300 dots per inch) image, comparable to good quality lithographic offset printing. This discharging of small drum surface areas, on a digital basis, is accomplished within small tolerances over a range of web speeds from 100 to at least 300 feet/minute.

The imaging device 54 is supported by attachment at its opposite ends to a plate-like spring 75 (FIGS. 2 and 3) which is in turn fixed to the movable part of a dovetail slide 76 above and parallel to drum surface 51. At the sides of array 70 are electrically insulating follower strips 77 which are urged to ride against the bearer bands 51A. This arrangement maintains proper spacing of the imaging device to the photoconductive surface 51 and accommodates any out-of-round condition of the drum, its surface, or its rotating support. A micrometer type adjuster 78 acts on slide 76 to adjust side register of the array 70 to the drum 50. Also, a cam 79 can act against a bracket extension of the array to move the array 70 away from drum surface 51 against the force of spring 75.

The latent electrostatic image then is carried, as the drum rotates, past developing station 55 where it is subjected to the action of a special high speed liquid toner developer, thus forming a developed or visible image with merged toner particles, which image is thence transferred and fixed to the paper web or other material. The developer is a special proprietary combination of small particle size toner, having nominal sizes of 0.003 inch in width, dispersed in a suitable volatile carrier liquid, and combined with a charge agent which maintains a negative charge on the toner particles in the range of 60 to 75 Picamohs/cm$^2$. The developing station 55 comprises a shoe member 80 (which also functions as a developer electrode) which is electrically isolated from drum 50, and extends across drum surface 51. The face of shoe member 80 is being curved to conform to a section of drum surface 51 at a spacing of about 50 microns (0.020 inch). Liquid developer from a supply and refreshing system is circulated through shoe member 80. The shoe is pivotally connected at its opposite sides to control levers 82 which are urged (as indicated in FIG. 1) to move shoe 80 toward drum surface 51. Electrically insulating rollers 83 on the side of the shoe ride against the drum bearer bands 51A to maintain the desired close spacing of the shoe to the drum.

Developer shoe 80 functions as an electrode which is maintained at a potential in the order of +500 to 600 V DC. Thus the negatively charged toner particles are introduced into the shoe cavities and dispersed among electrical fields between the image areas and the developer electrode, on the one hand, and between the background or non-image areas and the developer electrode on the other hand. Typically, the electrical fields are the result of difference in potential a) between the image areas (+100 to 1450 V) and the developer electrode (+500 to 600 V), which cause the toner particles to deposit on the images areas, and b) between the background areas (+100 to 300 V) and the developer electrode (+500 to 600 V), which causes toner particles to migrate to the developer shoe in those areas.

Expressed another way, the electrical fields in the image and non-image areas are reversed, and are in the order of at least 2 V/micron. The result is a high quality distinction between image and background, and good coverage of solid image areas.

As the drum surface passes from the developer shoe, a reverse rotating metering roll 90, driven by a motor 91, and spaced parallel to the drum surface by about 50 to 75 microns by insulating ends wheels 90A, acts to shear away any loosely attracted toner in the image areas, and also to reduce the amount of carrier liquid carried onward by drum surface 51 with the toner deposited thereon, and to scavenge away any loose toner particles which might have migrated into the background areas. This metering roll has applied to it a bias potential in the order of +200 to 600 V DC, varied according to web and drum surface velocity. Roll 90 is also mounted on control arms 92 which are biased to move the roll toward drum surface 51 as indicated. The roll is located over pan 89 so developer taken from the roll by its scraper 90B will fall into the return system.

FIG. 1 also shows transfer apparatus 56 as including a pair of idler rollers 93 which guide web W onto the drum surface 51, and behind the web path at this location is a transfer corotron 95. The web is driven at a speed equal to the velocity of drum surface 51, to minimize smudging or disturbance of the developed image on the surface 51.

The transfer corotron focuses ions from the corotron onto the web-drum contact band on the reverse side of web W. The transfer corotron 95 has applied to it a voltage in the range of +6600 to 8000 V DC, and the distance between the corotron wire 93 and the surface of web W is in the order of 0.002 to 0.003 inch. Both toner particles and carrier liquid transfer to the web, including carrier liquid on the drum surface 51 in the background areas. The web path continues into a fuser and dryer apparatus (not shown) wherein the carrier liquid is removed from the web material and the toner particles are fused thereto.

The cleaning apparatus 58 is used to remove all toner particles and all carrier liquid from drum surface 51. Erase lamp 110 is arranged to flood surface 51 with light at sufficient intensity to either a blue light or white light fluorescent tube. The foam roller 112 (of open cell material) is fixed to a power driven shaft 113 which is rotated in the opposite direction to drum surface motion, as indicated on FIG. 1, so as to compress against and scrub surface 51. The compression/expansion of the open cell foam during this action will tend to draw carrier liquid and any included toner particles remaining on the surface 51 off that surface and into the cells of roller 112. A cleaning blade 115, comprising a stiff, but flexible, polyurethane wiper blade, is mounted with its edge extending forward and into contact with surface 51, just beyond foam roller 112. Blade 115 acts to wipe dry the drum surface 51, since the photoconductor surface must be dry when it reaches the charging station.

FIGS. 4–7 show the LED array assembly with the self focusing lens 72 located along the front horizontal centerline of the array, secured between upper and lower front plates 120A and 120B which include parts extending over the top and bottom of the array (see FIG. 7). Each of these has apertures (not shown) normally closed by cover plates 122 which are sealed to the upper and lower plates, but may be removed to provide access to internal circuits, as later described. The rear of the array includes the base block 74 and at its opposite ends are electrical connectors 124 (one shown in FIG. 5) which provide the data and timing inputs to the array, while a central connector block 125 provides power supplies. The base block includes an internal cavity through which a cooling liquid is circulated through appropriate openings 127, one of which is shown in FIG. 5.

The purpose of such cooling is that, to attain high speed printing of the orders previously mentioned, maximum light intensity is required from the LEDs. There is a variation of about 1% in average power output of the LEDs per 1 degree C, and considerable heat is generated when the LEDs are driven at higher outputs, which tends to raise the temperature of the semiconductor junction and reduce the LED output efficiency. Thus, cooling the LEDs increases the light output available and extends the life of the LEDs.

Resilient Array Support

Figure 2:
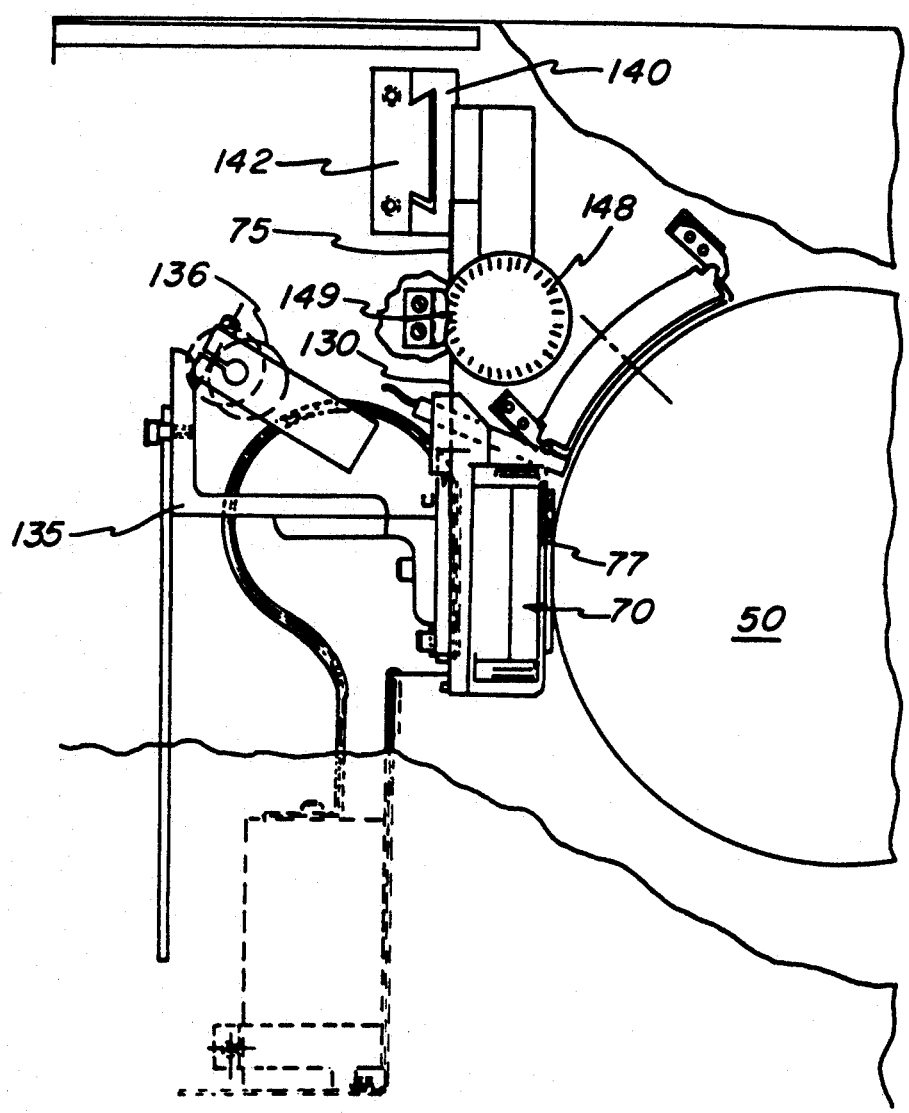
FIG. 2 is a view illustrating the mounting of the LED imaging array in operative relation to the photoreceptor drum of the printing engine.

The threaded holes 128 receive mounting bolts to hold the entire array onto the lower end of the flat mounting spring 75 (FIGS. 2 and 3). This spring has a cutout 131 at its lower edge which clears connector block 125.

At the opposite front sides of array 70 are the previously described follower strips 77 of electrically insulating wear-resistant material which provide a form of bearing surface aligned to press against the end bands 51A of drum surface 51. As mentioned, strips 77 are of a precise thickness, and function to maintain an exact spacing of lens 72 from the image plane (i.e. drum surface photoreceptor 51) in spite of any out of round or other condition which might be introduced to the drum or its mounting as the result of slight manufacturing or assembly discrepancy or due to wear. Spring 75 acts to urge the entire array toward the drum, thus holding the strips 77 against bands 51A during operation.

A pair of brackets 135 are attached to the rear of the array (FIGS. 2 and 3) and are adapted to be engaged by cams 136 carried on a shaft 137 which is rotatably supported in the side frames of the press and controlled by a handle 138. The cams are rotated (see the phantom lines in FIG. 2) to move the array 70 way from the drum surface, when it is desired to service the unit, particularly to remove drum 50.

The upper end of spring 75 is fixed to the slide 140 of a dovetail guide 142, allowing limited lateral movement of the entire array. A side register control shaft 140 is rotatably mounted in the press side frame and has a threaded end 142 which is engaged in a correspondingly threaded hole in an arm 144 fastened to slide 140. A coil spring 145 acts between arm 144 and a collar 147 on shaft 140 to eliminate any play in the threaded parts. The knob 148 on the end of shaft 140 includes a circular scale (FIG. 2) which cooperates with an index pointer 149 mounted to the side frame and extending next to knob 148, to provide an accurate measure of slide motion in response to rotation of shaft 140.

Diode Configuration

Referring to FIG. 10, a substantially enlarged view of a single light emitting diode (LED) 150 is seen to include a finger or rod-like anode 152 about which a semiconductor is constructed. The semiconductor material is typically a doped Gallium Arsenide and there is a common cathode (not shown) connected to all the semiconductor junctions which are built up (by known methods) using a mask which produces the LED shape shown in FIG. 10. This shape can be characterized as generally of "hourglass" configuration. Thus, the LED has a generally flat face 154 surrounding the elongated anode 152, which occupies a substantial part of the center of the semiconductor, such that there is a gap in the light emitting surface corresponding to the area covered by the anode. The side edges 155, 156 are parallel and approximately of the same height as the center of the junction, along the cathode, while the curved top and bottom edges 157, 158 are of concave shape, generally with elliptical profiles. In an actual embodiment, the width of the LED at the cathode/junction joint is between 0.0028 and 0.0031 inch.

To obtain images with no undesirable voids, the pixel areas on the photoreceptor should be evenly exposed with sharp boundaries. The present system has a defined pixel spacing of 0.0033 inch, and the desired printed spot is a square filling the entire pixel area; see FIG. 11. The unique shape, size and design of the LED, as shown and described, is the result of considering several factors, including the distribution of light energy emitted by the LED, its effect resulting in photo-induced discharge of the photoreceptor surface 51 of the drum 50, the toner, and the development zone toner deposition characteristics. However, in the diode array there must be non-emitting space between LEDs to prevent electrical and optical crosstalk. Therefore, in-line arrays cannot be constructed with emitting areas equal to full pixel size.

Considering distribution of emitted light energy from a single LED, the increased central height compensates for the non-emitting region covered by the anode, and the increased height of the sides 155, 156 compensates for the necessary physical gap between adjacent LEDs in the array. It will be noted, from FIGS. 10 and 11, that the general configuration of emitted light energy from one LED is approximately a rectangle, with greater horizontal sides, with sharp edges at the pixel boundaries, and a slight concavity along the vertical sides.

However, to achieve high speed printing the photoreceptor (on the drum surface) has a uniform and considerable velocity throughout each pixel exposure. This relative motion, between the LED light output through lens array 72 and the photoreceptor surface, causes an increase in height of the area actually exposed during LED on-time. Thus, it will be appreciated that distribution of light energy falling on the photoreceptor surface is a function of the shape of the diode junction, the shape and position of the anode contacts, the imaging accuracy of the lens system, the turn-on time of the diode junction, and the motion of the photoreceptor past the LED during exposure.

Analysis of these complex variables has resulted in an optimum emitter shape as shown, with notable characteristics of
  a) a center finger-shaped anode, which overlies the enlarged central region of the semi-conductor face,
  b) a height smaller than the pixel size in the direction of photoreceptor motion, and
  c) and hour-glass like shape, particulary the enlarged side ends of the semi-conductor face, to smooth the transition to adjacent pixels.

Figure 11:
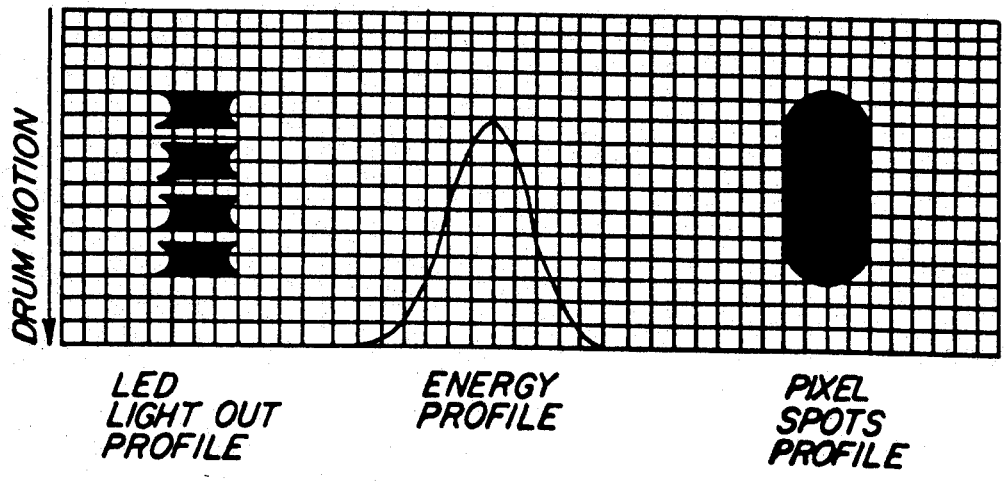
FIG. 11 is a diagram illustrating the light output of the novel LED and of the resultant developed image of adjacent pixels.

FIG. 11 illustrates the resultant profile of light emitted at the LED surface during four separate exposures, each spot under the previous ones, the energy profile of the novel configured LED, and the resulting developed spots profile on the photoreceptor surface. The resolved light beam through the lens to the photoreceptor surface has the shape of a horizontally enlarged rectangle with concave sides, and this shape is transformed to a generally square exposed pixel area, due to rotating motion of the photoreceptor during exposure of a given pixel area. It should be noted that the developed image results in satisfactory filling between adjacent pixels and good boundary definition.

Data Handling and Loading System

Figure 13:
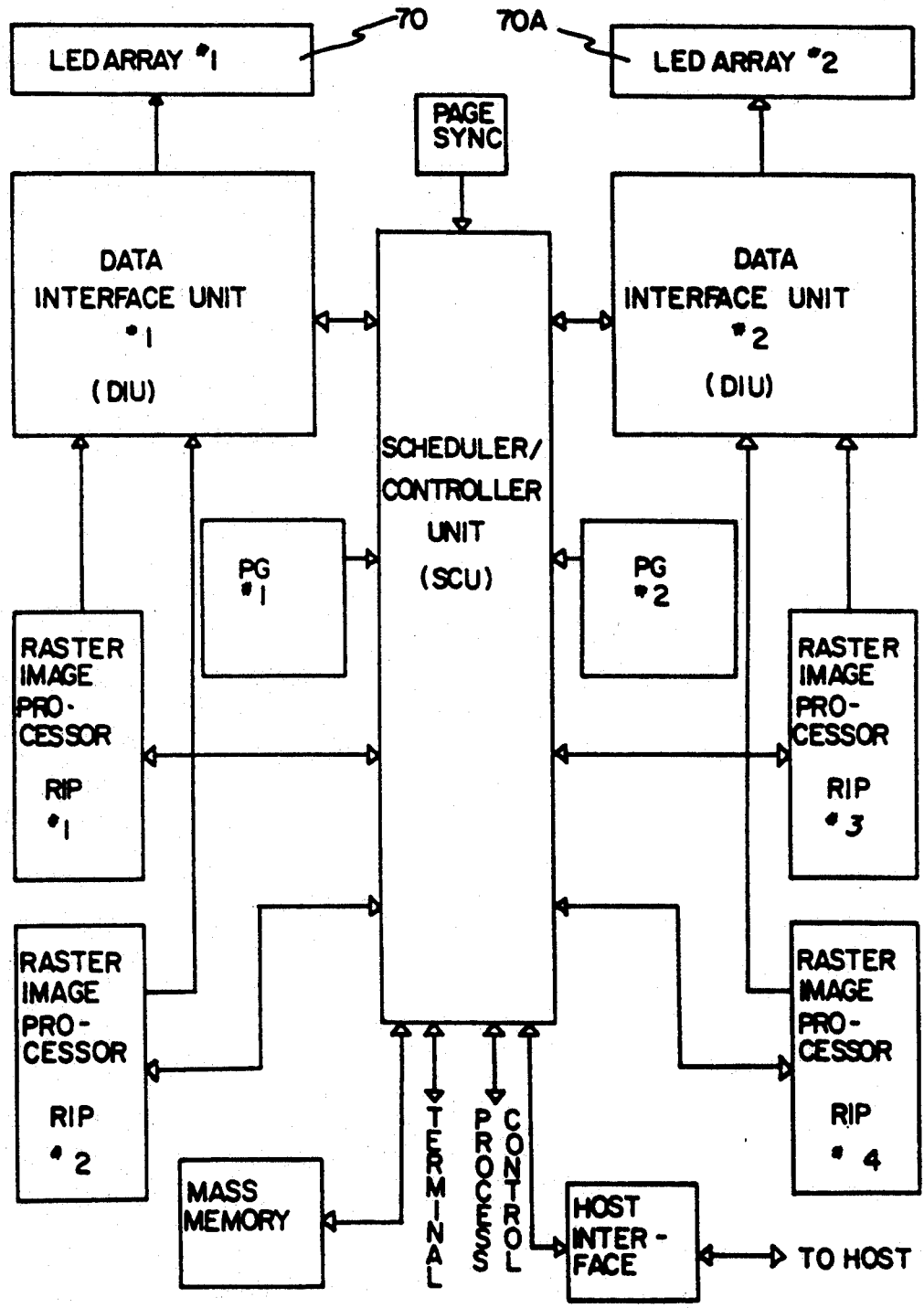
FIG. 13 is a block diagram of the over-all image information system of a printer using the array of the present invention.

FIG. 13 illustrates the general organization or architecture of equipment for assembly and processing of digital image information, which ultimately is used to drive the LED arrays 70 and 70A in an imaging device 54. The array is particularly adapted to use in a high speed electronic/mechanical printing press with capability for on demand printing. It can print "variable data" real time and has the capability to merge variable data with pre-rasterized images stored in the system. These pre-rasterized images, referred to as "base forms", can be stored for repeated printing.

The digital electronic imaging system provides electronic printing capabilities for high speed presses, incorporating both fixed and variable images on a page-by-page basis. The four basic components of the imaging system are the Scheduler Control Unit (SCU), the Raster Image Processor (RIP), the Data Interface Unit (DIU), and the LED array (see FIG. 13). The controlling intelligence behind the imaging system is accomplished through the SCU. The system shown includes arrays and associated hardware for two printing engines, however the following description is directed to one of them, it being understood that the second unit is a duplicate of the first.

The SCU provides the top-level system synchronization for the imaging system. It synchronizes all print data to the web, prepares all imaging resources that are required, channels text data from the host computer, and controls all data transfer through the system. The SCU will control the two print engines, one of which (PE1) is shown in FIG. 1. Each print engine will have associated with it one RIP and its own DIU and LED array. ,In a successful embodiment the SCU is a Motorola 68020-based VME system running UNIX and RTUX (see FIGS. 5 and 6). RTUX is a real-time system that co-resides with UNIX.

The raster image processor (RIP) is a known form of character generator, and is commercially available. Basically, it accepts information, such as ASCII character codes, and outputs bit-mapped information for generating such characters in a dot pattern, based on the font(s) selected. A "font" in this system is considered to be the text style and size that the variable images may be printed in.

The DIU contains all the storage and location circuitry required for storing text and baseforms in rasterized bit-map format. In an actual embodiment a DIU constitutes 200 MB of RAM, organized into four memory sections, each of which have rows of 6144 bits (the number of LEDs in the arrays) by 8192 rows to hold the bit-mapped information for an image. Pairs of these memory sections cooperate with each other to provide bit-mapped fixed (e.g. base form) and bit-mapped variable image data. In use one pair of memory sections is scanned to output data to the registers at the LED array, while the other pair is loaded with data. Thus, for the described embodiment enough memory is available in each DIU for both the base form and variable information for two images. The SCU controls the input and output of data to and from the DIUs, and transfers, line-by-line, images to the LED array 70.

Figure 14:
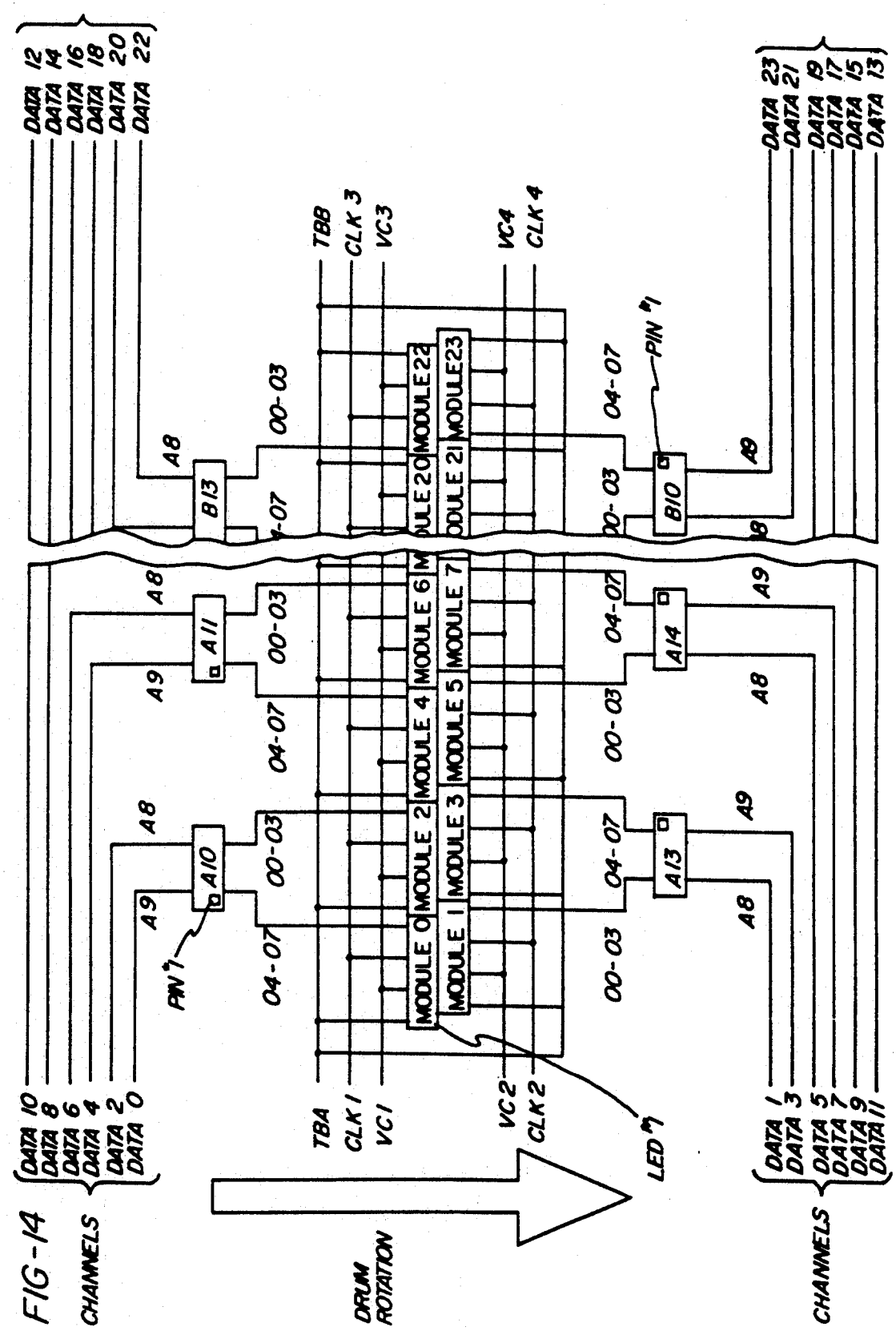
FIG. 14 is a block diagram of the parallel data and timing inputs to the various modules which make up the array.

Referring to FIG. 14, array 70 is divided into twenty four modules (marked M-0–M-23). It will be appreciated that for ease of illustration only the first seven and last four of the modules are illustrated. Each module contains 256 LEDs in a row, preferably fabricated in an elongated strip. Referring to FIG. 9 and FIG. 14, it will be noted that the blocks of LED assemblies are arranged into two rows, with the space between adjacent LEDs in one row being aligned with the centers of the LEDs in the other row. This allows close packing of the LEDs without crosstalk between adjacent ones. The driving of the LEDs in the second row is simply delayed by the time required for the photoreceptor to move a row of pixel areas from one row to the next, and the result is that all pixel areas across every row on the photoreceptor can be exposed, or not, to an appropriate light whereby the background regions are discharged as already explained.

Data is loaded from the DIU over twenty-four parallel data channels, marked DATA 0–DATA 23, serially into EPROM circuits which in turn feed data to the registers within the modules. The data channels lead to two banks of EPROM circuits A-10 through A-15 and B-10 through B-15 (only EPROMs A-10, A-11, A-13 and A-14, and B-10 and B-13 are shown in the drawing).

Figure 15:
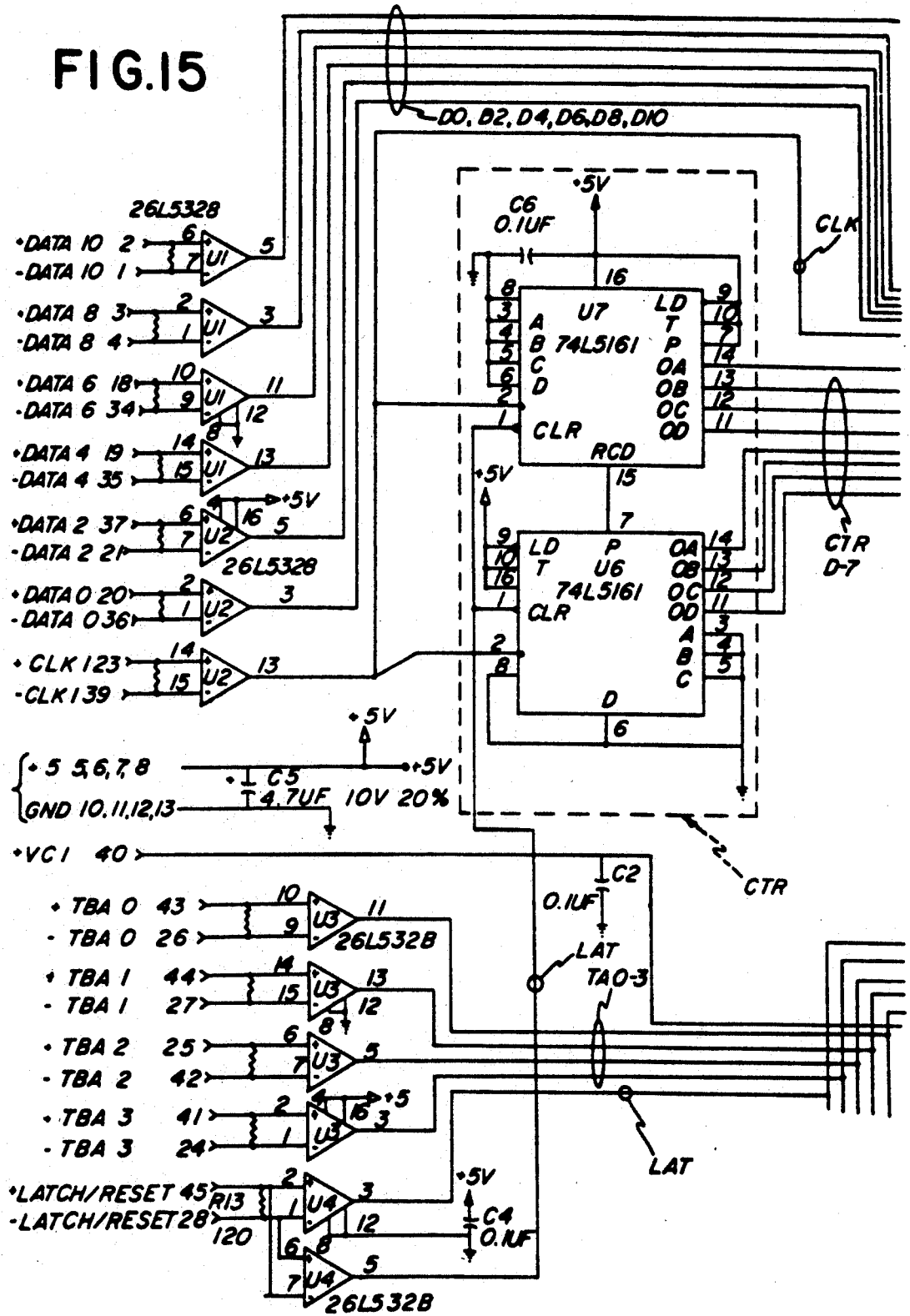
FIGS. 15 and 16 are, taken together, a circuit diagram of the power, data, and timing inputs to one module of the array; a small portion of each figure is a duplication of the other where they adjoin, to aid in viewing them together.
Figure 16:
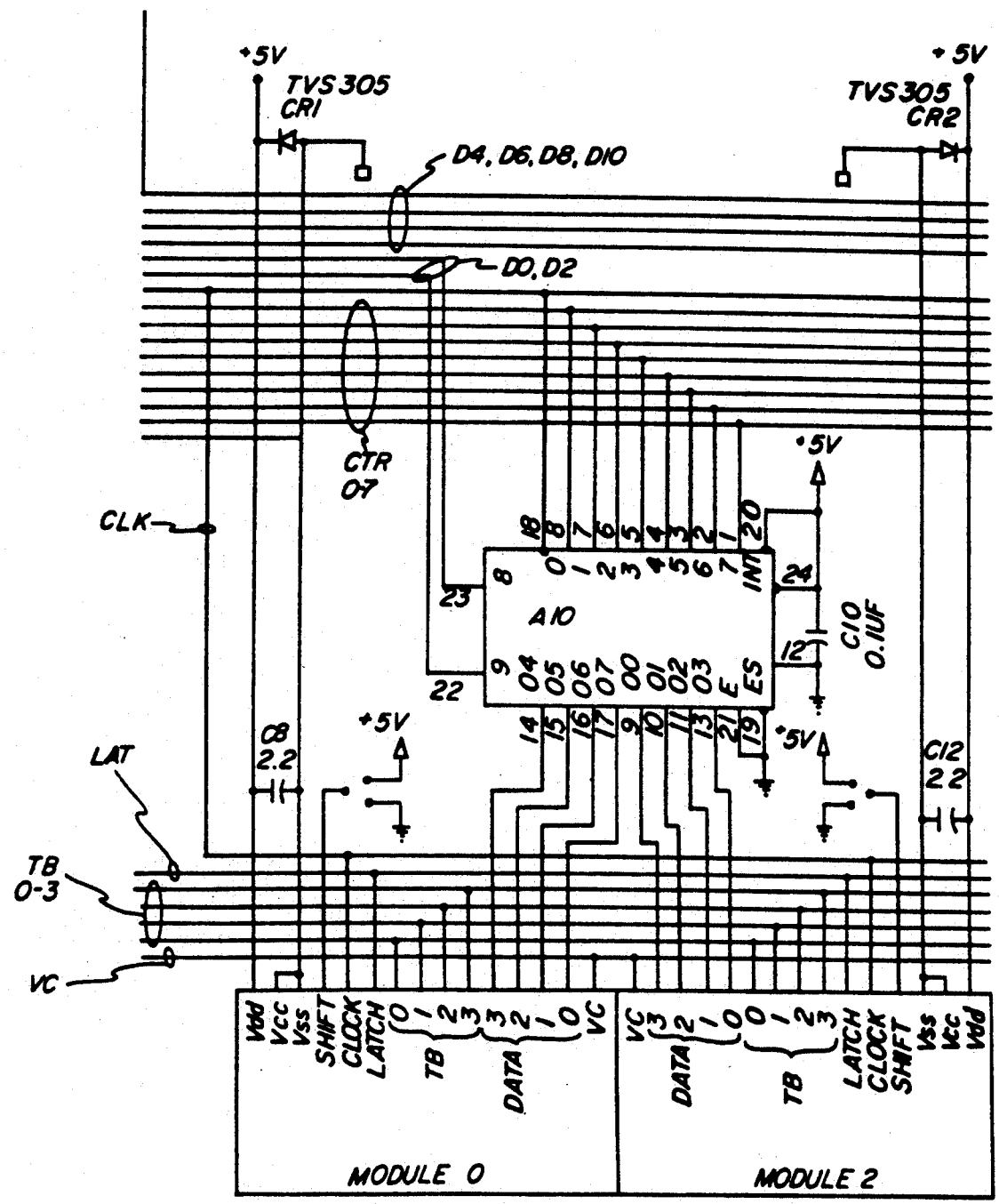

The output of the EPROM circuits is a series of four-bit data words derived from correction or compensation information stored into the EPROMs. This output is directed to the modules along the four data lines (DATA 0-3) as shown in FIG. 16 running from EPROM A-10 to Module 1 and Module 2. The four inputs labelled TB 0-3 are timing inputs for controlling distribution of data by comparator circuits into the various LED driver circuits. The timing inputs are received from the DIU over paired data lines TBA 0-TBA 3 as shown in FIG. 15, and its use is explained below.

Figure 17:
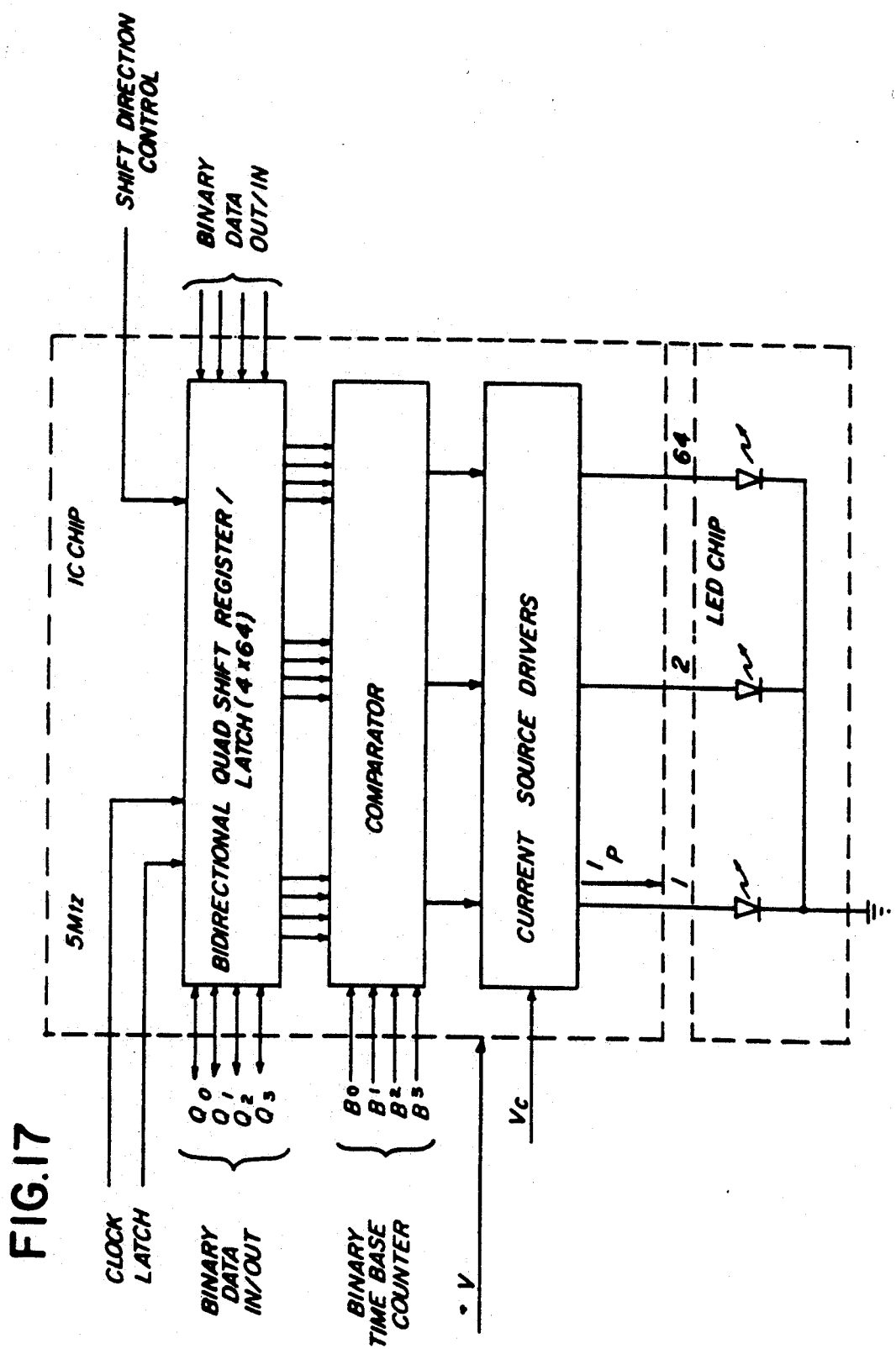
FIG. 17 is a block diagram of the circuits of one module, illustrating the manner in which data is handled to drive each LED in the array.

FIG. 17 shows in block diagram form the arrangement of data register/latch and driver circuits within a module for the 256 individual LEDs in that module. There is a current-source driver for each LED which will apply driving power to the LED for generating a small light beam onto the drum surface 51 at a given pixel location. Each driver circuit is in turn driven from a comparator circuit which also receives timing (or commutating) information for serial distribution of the LED driving data to the individual LED drivers circuits.

It is a characteristic of any LED array that the individual LEDs will exhibit some variation in output light intensity even though they are all driven at the same potential with the same current. Thus, when the arrays 70 are constructed, and the twenty-four modules of 256 LEDs each are mounted (as in FIG. 4-9) in predetermined closely spaced positions, the LEDs are each individually energized and their outputs sensed and recorded, as by a photometer. The resulting information is translated into correction data which is then stored in the EPROMs. Then, when the writing data instruction is transferred from the DIU to the EPROMs, they in turn output appropriate four-bit data words or instructions to the register/latch circuits in the modules. Thus, the basic writing data input signal is modified, actually expanded, according to the stored information in the EPROMs, to modify the time duration of the driver output, as explained later.

It will be appreciated that the shift registers for each module are loaded serially, while data is transmitted in parallel to each module. In other words, data is loaded simultaneously as to all modules, but sequentially into each module. Thus, referring to FIG. 14, data moves over twenty-four parallel data channels from the DIU to the input side of the LED array; these data channels are shown divided top and bottom between the upper row and lower row array modules, and right to left of the array, and (as previously mentioned) are labelled DATA 0 through DATA 23. The data channels lead to two banks of EPROM circuits A-10 through A-14 and B-10 through B-23 (only EPROMs A-10, A-11, A-13 and A-14, and B-10 and B-13 are shown in the drawing).

Referring to FIGS. 15 and 16, data along with the 5 MHz clock comes from the DIU through paired data lines labelled +CLK 1/−CLK1 and +DATA,−DATA 1 through 10; these correspond to the even numbered data lines (DATA 0-10) at the upper left corner of FIG. 14, and are representative of the entire data transmission (DATA 0 through 23) from the DIU to the LED array as shown on FIG. 14. The paired data lines are input to conventional driver circuits (type 26LS32B). The clock signal is directed through a driver circuit to a pair of counter circuits (U6 and U7) which are connected to provide a 1-256 counter CTR, and the clock signal is also connected to the CLOCK input of each of the EPROMs and of the register/latch circuits in the various modules, as seen in FIG. 16. The write data signals are directed from the data driver circuits to each of two data inputs at all the EPROMs.

Counter CTR has eight output lines CTR 0-7 which are connected to the corresponding inputs 0-7 of each EPROM (FIG. 16) and over which a count (in binary code) is sent to enable the respective EPROMs to receive on-off writing (pixel initiating) data for each pixel location. Thus, data arrives from the data driver circuits (FIG. 15) over lines D0, D2, D4, D6, D8 and D10 which are connected to the various EPROMs (two modules are served by one EPROM); data lines D0 and D2 are shown connected to the EPROM A-10 for Module 0 and Module 2 (FIG. 16). In turn, the EPROMs have data outputs in the form of binary code via four data lines, which extend to the shift register/latch circuits of each module (see FIG. 17) and which include the comparative data for each LED. These are shown as the inputs DATA 0, 1, 2, 3 on Module 0.

As mentioned, the EPROMs are programmed to store comparative data concerning the relative light output intensities of the LEDs in the array. In operation this writing data is clocked out of the DIU memories and into the EPROMs at, for example, 5 MHz. Thus all EPROMs are interrogated for information to drive all LEDs for the "next" line of pixels during a period of 51 microseconds. The LED driving data (as earlier explained) is a four-bit code, comprising sixteen discrete numbers; a zero represents an "off" condition, and numbers one through fifteen depict compensation information for the LEDs as stored in the EPROMs. This driving data is transferred under control of the same clock into the latch/registers of the modules. Thus a line of pixel initiating or writing data is transferred from the DIU to the EPROMs, enhanced with the compensation data, and is serially transferred into the latch/registers of the modules, ready for subsequent use in the function of actually driving the individual LEDs.

Compensated LED Driving

An encoder pulse generator PG (FIGS. 1 and 13) is driven from the shaft of drum 50 and provides outputs equal to one-eighth of a pixel height, i.e. eight pulses per pixel dimension around the drum. That output divided by eight is the source of the latch pulse train, each latch pulse coinciding with the top border of a line of square pixel areas across the photoreceptor surface. FIG. 18 shows the relationship of data in clock pulses, latch pulses, and timebase pulses. Due to the variable speed capability of the apparatus, the duration of successive timebase pulses will vary considerably, but there will always be just sixty-four of them; at a web speed of 100 ft./min. the latch pulse rate will be 16.5 KHZ, while at 300 ft./min. this rate will be 49.5 K Hz. Latch pulse width in all instances is in the order of 60 nsec, but it will be appreciated the sixty-four timebase pulses will be adjusted to the latch pulse rate The SCU receives the PG outputs (for each printing engine) and divides the time between leading edges of successive latch pulses by sixty-four, and generates a time base count which equals 1/64th of the latch/reset interval. This represents the maximum time, at a chosen drum and web speed, during which an LED can be driven. This timebase information is sent to the time base drivers and to a pair of latch/reset drivers (FIG. 15) over the paired time base lines TBA 0–TBA 3 and the latch/reset pair. The four timebase signal lines and the latch/reset line are designated TB 0–3 and LAT. The LAT signal leads to the latch/registers, and the TB 0–3 signals are directed to the comparator circuits (see FIGS. 16 and 17). The time between latch pulses in effect represents a time interval or window during which the LEDs may be driven, depending upon the state of the driving data previously stored in the latch-/registers for each LED. It will be recalled that this includes the compensation data for the individual LEDs. As to each LED, if there was an "on" signal in the pixel originating data, then the driving data will indicate that the LED is to be driven for at least a pre-determined minimum of the entire interval between latch pulses.

As shown on FIG. 18, if a particular LED is to be energized, it will be powered (i.e. driven) for no less than 54% of the timebase interval, the duration of the minimum "on" signal. The comparative data will determine the extension of on-time into the optional band of fourteen timebase counts, before and after the "basic" string of timebase counts, by increments of two timebase counts, one before and one after the basic "on" signal. There is thus a gradation of effective "on" signals to each LED which is to be driven, and this gradation will change with drum (and web) speed since the timebase interval, and the duration of each timebase pulse, will change as the encoder PG changes speed along with the drum. Also, the increase/decrease of LED on-time is centered about the minimum on-time, which in turn occupies the middle thirty-six of the total sixty-four timebase pulses, regardless of drum and web speed.

As mentioned, the SCU receives the encoder (PG) outputs and divides the time interval between successive latch pulses by sixty-four, and outputs a corresponding number of timebase counts or pulses during that interval. These are supplied to the comparator circuits in the modules; the connections to Module 0 and Module 2 are shown in FIG. 16. Assuming an LED is to driven, the four-bit binary code over lines TB 0–3 will determine which of the first fourteen timebase pulses will first enable the corresponding driver circuit. In effect the time base count decrements from 14 to 0, followed by thirty-six counts during which the driver circuit is enabled, then the count progresses up to 14 (see FIG. 18 "timebase count"). Thus, information over lines TB 0–3 provides the sequential timebase pulses to the comparators (FIG. 17) to define the potential on-time of an LED, and also combines with the compensated driving data from the latch/register.

Also the latch pulses are transmitted to latch/reset drivers (FIG. 15) which have outputs LAT to the module latch/registers and to counter CTR to reset them each time sixty-four timebase counts have occurred, e.g. in time for the next row of pixel areas.

In the example shown in FIG. 18, the particular LED to be driven (LED output) requires the minimum driving, so its driver output begins at timebase count fifteen, and ends after timebase count fifty. If the comparative information calls for greater driving time, the driver circuit will be enabled at some timebase count less than fifteen and disabled after a corresponding count greater than fifty.

It should be emphasized that these timebase pulses are not specific times, but each timebase pulse is variable since the latch interval varies with drum and web speed. In the preferred embodiment, writing data is loaded into the EPROMs A-10 etc. at an SCU clock rate of 5 MHz. That results in all twenty-four modules having data for one line loaded in approximately 51 microseconds. Compensated data is transferred to the latch/registers at the same rate and is transferred out of them to power the driver circuits, in cooperation with the comparator circuits, at between approximately 56 and 168 microseconds, depending upon press speed and latch pulse rate. Thus, it can be seen that "exposure time" for any given pixel will be between about 30 and 56 microseconds at 300 ft./min. web speed and between 90 and 168 microseconds at 100 ft./min.

As shown in FIGS. 14–17, the control voltage $V_c$ for the current-source driver circuits is derived from a separate source which in turn is controlled through the press drive motor speed controller 32. Thus, as drum and web speed increases, this voltage is also increased. Typically this voltage varies from 7 V DC at 100 ft./min. to 15 V DC at 300 ft./min. In this manner, additional compensation, uniform as to all driver circuits, is introduced to offset the decrease in exposure time for a single pixel area on the photoreceptor surface as drum and web speed is increased.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A high speed image forming system for creating a digitally defined image on a photoreceptor surface, comprising:
    1) an array including a plurality of pixel generators each capable of selectively generating a light beam of dot-like configuration and arranged in adjacent positions such that the light beams therefrom can be focused to illuminate uniformly sized adjacent pixel areas within an image area on the photoreceptor surface to produce an image;
    2) means for producing relative motion through a range of velocities between said array and the photoreceptor surface;

3) a latch pulse generator for producing latch pulses synchronized to the relative motion between said array and the photoreceptor;
4) driving circuits connected to each of said pixel generators to cause the generators to illuminate;
5) data register means receiving said latch pulses including separate registers, one register for each of said driving circuits for holding data for said driving circuits to determine pixel areas to be illuminated by said pixel generators, said registers being organized into distinct groups;
6) memory means for storing compensation information based on differences in optical output power of individual pixel generators in the array;
7) a plurality of data input channels connected in parallel, one for each of said groups of data register means,
   (a) said data input channels supplying pixel writing data to said memory means;
   (b) said memory means supplying compensated pixel driving data, in response to said writing data, to said data register means;
8) clock means for controlling transfer of writing data from said data input channels;
9) means for generating timebase pulses;
10) comparator means controlled by said timebase pulses to transfer a compensated pixel driving data to said driving circuits, wherein said timebase pulses vary the length of on-time of the pixel generators depending upon the compensation information, said comparator means synchronising the timebase pulses to the latch pulses from said latch pulse generator so that there are a same number of timebase pulses centered between successive latch pulses, wherein said latch pulses control a rate of transfer of data from said data register means.

2. A system as defined in claim 1, including
a bit-mapped memory adapted to store lines of pixel writing information for an image to be reproduced,
means for transferring data from said bit-mapped memory to said data input channels including means controlled by said clock means for scanning simultaneously different selected portions of a line of said bit-mapped memory and for applying the data information in parallel to said data input channels to transfer a line of pixel writing information in parallel paths of data information each applied simultaneously in serial fashion to all data storage registers of all the modules.

3. A system as defined in claim 1, wherein said
memory means has memory locations for each potential pixel in an image area, further including
a raster image processor for creating bit-mapped image information and placing such image information in said memory means, and
means for reading image information one line at a time from said memory means and transmitting such information to said data input channels for placing such information in said data storage registers.

* * * * *